(12) United States Patent
Bullock et al.

(10) Patent No.: US 6,243,571 B1
(45) Date of Patent: Jun. 5, 2001

(54) METHOD AND SYSTEM FOR DISTRIBUTION OF WIRELESS SIGNALS FOR INCREASED WIRELESS COVERAGE USING POWER LINES

(75) Inventors: Scott R. Bullock, South Jordan; John M. Knab, Sandy, both of UT (US)

(73) Assignee: Phonex Corporation, Midvale, UT (US)

( * ) Notice: Subject to any disclaimer, the term of this patent is extended or adjusted under 35 U.S.C. 154(b) by 0 days.

(21) Appl. No.: 09/157,632

(22) Filed: Sep. 21, 1998

(51) Int. Cl.[7] .................................................. H04Q 7/32

(52) U.S. Cl. ............................................ 455/402; 379/142

(58) Field of Search .................. 340/310.06, 310.02, 340/310.07, 310.08, 870.01, 870.02, 310; 455/402, 3.1, 3.3, 14, 561, 562, 457, 12.1, 11.1, 401; 379/55.1, 142, 51, 160, 67.1

(56) References Cited

U.S. PATENT DOCUMENTS

| | | | |
|---|---|---|---|
| 2,510,273 | 6/1950 | Barstow et al. . | |
| 2,516,211 | 7/1950 | Hochgraf | 179/3.5 |
| 2,516,763 | 7/1950 | Edson et al. | 179/2.5 |
| 2,535,446 | 12/1950 | Mitchell | 179/2.5 |
| 2,567,908 | 9/1951 | Levy | 177/356 |
| 2,577,731 | 12/1951 | Berger | 179/2.5 |
| 2,654,805 | 10/1953 | Deer | 179/2.5 |
| 2,820,097 | 1/1958 | Finlay | 179/2.5 |
| 2,828,363 | 3/1958 | Ray | 179/2.5 |
| 2,932,794 | 4/1960 | Crow | 328/156 |
| 3,045,066 | 7/1962 | Beuscher | 179/2.5 |
| 3,280,259 | 10/1966 | Cotter | 179/2.5 |
| 3,334,185 | 8/1967 | Marlot | 179/2.5 |
| 3,369,078 | 2/1968 | Stradley | 179/2.5 |
| 3,399,397 | 8/1968 | Josephson | 340/216 |
| 3,400,221 | 9/1968 | Wolters | 179/2.5 |
| 3,475,561 | 10/1969 | Krasin et al. | 179/15 |
| 3,521,267 | 7/1970 | Lester et al. | 340/310 |
| 3,529,216 | 9/1970 | Kolm et al. | 317/147 |
| 3,659,280 | 4/1972 | Donohoo | 340/310 |
| 3,693,155 | 9/1972 | Crafton et al. | 340/147 R |
| 3,810,096 | 5/1974 | Kabat et al. | 340/147 R |
| 3,818,481 | 6/1974 | Dorfman et al. | 340/310 R |
| 3,846,628 | 11/1974 | Wetherell | 307/3 |
| 3,852,740 | 12/1974 | Haymes | 340/416 |
| 3,876,984 | 4/1975 | Chertok | 340/152 R |
| 3,911,415 | 10/1975 | Whyte | 340/310 A |
| 3,922,664 | 11/1975 | Wadsworth | 340/276 |
| 3,924,223 | 12/1975 | Whyte et al. | 340/310 R |
| 3,925,728 | 12/1975 | Whyte | 324/142 |
| 3,925,763 | 12/1975 | Wadhwani et al. | 340/164 R |
| 3,942,168 | 3/1976 | Whyte | 340/310 R |
| 3,949,172 | 4/1976 | Brown et al. | 179/2.5 R |
| 3,967,264 | 6/1976 | Whyte et al. | 340/310 A |
| 3,973,087 | 8/1976 | Fong | 179/170 R |
| 3,980,954 | 9/1976 | Whyte | 325/48 |
| 4,012,733 | 3/1977 | Whyte | 340/310 A |
| 4,012,734 | 3/1977 | Jagoda et al. | 340/310 A |
| 4,016,429 | 4/1977 | Vercellotti et al. | 307/149 |

(List continued on next page.)

*Primary Examiner*—Dwayne Bost
*Assistant Examiner*—Jean Alland Gelin
(74) *Attorney, Agent, or Firm*—Lloyd W. Sadler

(57) ABSTRACT

A method and system for the reception, conversion and distribution of wireless communication signals received from such communication devices as PCS, Cellular, and Satellite over AC power lines commonly found within a building, office, home or other structure is disclosed. This invention specifically provides for the distribution of wireless signals in structures where otherwise signal degradation and/or blockage are common. Moreover, this invention takes advantage of the existing AC power lines to create a communication channel avoiding the necessity of rewiring the building or other structure. This invention provides important improvements to the signal coverage and reception of wireless transmitted signals within buildings and other structures and does so in an efficient and cost effective manner.

8 Claims, 5 Drawing Sheets

U.S. PATENT DOCUMENTS

| | | | |
|---|---|---|---|
| 4,057,793 | 11/1977 | Johnson et al. | 340/310 R |
| 4,058,678 * | 11/1977 | Dunn et al. | 379/51 |
| 4,065,763 | 12/1977 | Whyte et al. | 340/310 R |
| 4,107,656 | 8/1978 | Farnsworth | 340/151 |
| 4,161,027 | 7/1979 | Russell | 364/492 |
| 4,173,754 | 11/1979 | Feiker | 340/310 R |
| 4,174,517 | 11/1979 | Mandel | 340/310 A |
| 4,218,655 | 8/1980 | Johnston et al. | 455/39 |
| 4,222,035 | 9/1980 | Lohoff | 340/167 R |
| 4,239,940 | 12/1980 | Dorfman | 179/2.51 |
| 4,254,403 | 3/1981 | Perez-Cavero et al. | 340/310 R |
| 4,307,380 | 12/1981 | Gander | 340/310 R |
| 4,321,581 | 3/1982 | Tappeiner et al. | 340/310 R |
| 4,323,882 | 4/1982 | Gajjar | 340/310 R |
| 4,344,066 | 8/1982 | Beggs | 340/310 A |
| 4,357,598 | 11/1982 | Melvin, Jr. | 340/310 A |
| 4,371,867 | 2/1983 | Gander | 340/310 R |
| 4,377,804 | 3/1983 | Suzuki | 340/310 A |
| 4,386,436 | 5/1983 | Kocher et al. | 455/151 |
| 4,400,688 | 8/1983 | Johnston et al. | 340/310 R |
| 4,408,185 | 10/1983 | Rasmussen | 340/310 A |
| 4,408,186 | 10/1983 | Howell | 340/310 A |
| 4,429,299 | 1/1984 | Kabat et al. | 340/310 R |
| 4,433,326 | 2/1984 | Howell | 340/310 A |
| 4,442,319 | 4/1984 | Treidl | 179/2 A |
| 4,471,399 | 9/1984 | Udren | 361/64 |
| 4,473,817 | 9/1984 | Perkins | 340/310 R |
| 4,475,193 | 10/1984 | Brown | 370/124 |
| 4,479,033 | 10/1984 | Brown et al. | 179/2.51 |
| 4,495,386 | 1/1985 | Brown et al. | 179/2.51 |
| 4,507,646 * | 3/1985 | Hamlin et al. | 340/310.05 |
| 4,514,594 * | 4/1985 | Brown et al. | 455/401 |
| 4,523,307 | 6/1985 | Brown et al. | 370/30 |
| 4,535,447 | 8/1985 | Rosanes et al. | 370/77 |
| 4,538,136 | 8/1985 | Drabing | 340/310 R |
| 4,556,864 | 12/1985 | Roy | 340/310 A |
| 4,556,865 | 12/1985 | Fukagawa et al. | 340/310 R |
| 4,556,866 | 12/1985 | Gorecki | 340/310 A |
| 4,559,520 | 12/1985 | Johnston | 340/310 R |
| 4,599,598 | 7/1986 | Komoda et al. | 340/310 A |
| 4,609,839 | 9/1986 | Howell | 307/542 |
| 4,611,274 | 9/1986 | Machino et al. | 364/200 |
| 4,633,218 | 12/1986 | Palsgrove et al. | 340/310 A |
| 4,638,298 | 1/1987 | Spiro | 340/827 |
| 4,638,299 | 1/1987 | Campbell | 340/310 A |
| 4,641,126 | 2/1987 | Crowe | 340/310 A |
| 4,641,322 | 2/1987 | Hasegawa | 375/1 |
| 4,642,607 | 2/1987 | Strom et al. | 340/310 A |
| 4,644,321 | 2/1987 | Kennon | 340/310 A |
| 4,675,648 | 6/1987 | Roth et al. | 340/310 A |
| 4,701,945 | 10/1987 | Pedigo | 379/66 |
| 4,745,391 | 5/1988 | Gajjar | 340/310 A |
| 4,745,392 | 5/1988 | Ise et al. | 340/310 R |
| 4,746,897 | 5/1988 | Shuey | 340/310 R |
| 4,749,992 | 6/1988 | Fitzemeyer et al. | 340/870.02 |
| 4,759,016 | 7/1988 | Otsuka | 370/95 |
| 4,763,103 | 8/1988 | Galula et al. | 340/310 R |
| 4,772,870 | 9/1988 | Reyes | 340/310 R |
| 4,774,493 | 9/1988 | Rabinowitz | 340/310 A |
| 4,783,780 | 11/1988 | Alexis | 370/95 |
| 4,788,527 | 11/1988 | Johansson | 340/310 A |
| 4,809,296 | 2/1989 | Braun et al. | 375/1 |
| 4,829,570 | 5/1989 | Schotz | 381/3 |
| 4,835,517 | 5/1989 | van der Gracht et al. | 340/310 A |
| 4,845,466 | 7/1989 | Hariton et al. | 340/310 R |
| 4,847,903 | 7/1989 | Schotz | 381/3 |
| 4,864,589 | 9/1989 | Endo | 375/1 |
| 4,866,733 | 9/1989 | Morishita | 375/1 |
| 4,890,089 | 12/1989 | Shuey | 340/310 A |
| 4,912,553 | 3/1990 | Pal et al. | 358/86 |
| 4,962,496 | 10/1990 | Vercellotti et al. | 370/11 |
| 4,963,853 | 10/1990 | Mak | 340/310 A |
| 4,968,970 | 11/1990 | LaPorte | 340/310 A |
| 4,988,972 | 1/1991 | Takagi | 340/310 A |
| 4,995,053 | 2/1991 | Simpson et al. | 375/1 |
| 5,003,457 | 3/1991 | Ikei et al. | 364/133 |
| 5,032,833 | 7/1991 | Laport | 340/825.02 |
| 5,049,876 | 9/1991 | Kahle et al. | 340/825.57 |
| 5,063,563 | 11/1991 | Ikeda et al. | 370/110.1 |
| 5,065,133 | 11/1991 | Howard | 340/310 A |
| 5,066,939 * | 11/1991 | Mansfield, Jr. | 340/310.06 |
| 5,127,045 * | 6/1992 | Cragun et al. | 379/88 |
| 5,136,612 | 8/1992 | Bi | 375/1 |
| 5,151,383 | 9/1992 | Dockery | 340/310 R |
| 5,155,466 | 10/1992 | Go | 340/310 R |
| 5,168,510 | 12/1992 | Hill | 375/40 |
| 5,187,865 | 2/1993 | Dolin, Jr. | 29/868 |
| 5,192,231 | 3/1993 | Dolin, Jr. | 439/620 |
| 5,210,518 | 5/1993 | Graham et al. | 340/310 R |
| 5,241,283 | 8/1993 | Sutterlin | 330/51 |
| 5,257,006 | 10/1993 | Graham et al. | 340/310 A |
| 5,262,755 | 11/1993 | Mak et al. | 340/310 R |
| 5,278,862 | 1/1994 | Vander Mey | 375/1 |
| 5,289,476 | 2/1994 | Johnson et al. | 371/37.1 |
| 5,319,634 | 6/1994 | Bartholomew et al. | 370/18 |
| 5,327,230 | 7/1994 | Dockery | 348/8 |
| 5,349,644 | 9/1994 | Massey et al. | 395/200 |
| 5,351,272 | 9/1994 | Abraham | 375/38 |
| 5,355,114 | 10/1994 | Sutterlin et al. | 340/310 A |
| 5,357,541 | 10/1994 | Cowart | 375/1 |
| 5,404,127 | 4/1995 | Lee et al. | 340/310.02 |
| 5,406,248 | 4/1995 | Le Van Suu | 340/310.01 |
| 5,406,249 | 4/1995 | Pettus | 340/310.06 |
| 5,410,292 | 4/1995 | Le Van Suu | 340/310.06 |
| 5,412,369 | 5/1995 | Kirchner | 340/310.03 |
| 5,424,709 | 6/1995 | Tal | 340/310.01 |
| 5,448,593 | 9/1995 | Hill | 375/267 |
| 5,452,344 | 9/1995 | Larson | 379/107 |
| 5,461,629 | 10/1995 | Sutterlin et al. | 371/30 |
| 5,463,662 | 10/1995 | Sutterlin et al. | 375/351 |
| 5,467,011 | 11/1995 | Hunt | 324/67 |
| 5,471,190 | 11/1995 | Zimmerman | 340/310.01 |
| 5,504,454 | 4/1996 | Daggett et al. | 329/304 |
| 5,533,101 * | 7/1996 | Myyagawa | 379/61 |
| 5,554,968 | 9/1996 | Lee | 340/310.01 |
| 5,559,377 | 9/1996 | Abraham | 307/104 |
| 5,623,531 * | 4/1997 | Nilssen | 455/402 |
| 5,630,204 | 5/1997 | Hylton et al. | 455/3.3 |
| 5,745,552 * | 4/1998 | Chambers et al. | 455/33.1 |
| 5,770,996 * | 6/1998 | Severson et al. | 340/310.008 |
| 5,832,364 * | 11/1998 | Gustafson | 455/14 |
| 5,892,758 * | 4/1999 | Argyroudis | 340/870.02 |
| 5,911,119 * | 6/1999 | Bartholomew et al. | 455/402 |
| 5,937,342 * | 8/1999 | Klline | 455/402 |
| 5,959,984 * | 9/1999 | Dent | 455/3.1 |
| 5,970,127 * | 10/1999 | Smith et al. | 455/402 |

* cited by examiner

METHOD AND SYSTEM FOR DISTRIBUTION OF WIRELESS SIGNALS FOR INCREASED WIRELESS COVERAGE USING POWER LINES

BACKGROUND OF THE INVENTION

1. Field of the Invention

This invention relates to the distribution of communication signals transmitted using wireless electronic communications systems including specifically personal communications systems (PCS), cellular, and satellite communication systems. More specifically, this invention relates to a distribution network, using AC power lines within a building or structure, for providing wireless communications coverage.

2. Description of Related Art

A variety of power line carrier telephone voice and/or data communication systems have been developed and are used to facilitate telephonic communications in locations where little or no availability exists for dedicated telephone wires. While these devices may provide a connection to the existing power lines they do not provide a network system for solving the wireless signal blockage problem within certain buildings or other structures and to distribute the wireless signal within such buildings or structures. The following United States and foreign patent documents are referred to the reader for background on power line communications systems: U.S. Pat. No. 2,510,273, 2,516,211, 2,516,763, 2,535,446, 2,567,908, 2,577,731, 2,654,805, 2,820,097, 2,828,363, 2,932,794, 3,045,066, 3,280,259, 3,334,185, 3,369,078, 3,399,397, 3,400,221, 3,475,561, 3,521,267, 3,529,216, 3,659,280, 3,693,155, 3,810,096, 3,818,481, 3,846,638, 3,852,740, 3,876,984, 3,911,415, 3,922,664, 3,924,223, 3,925,763, 3,925,728, 3,942,168, 3,949,172, 3,967,264, 3,973,087, 3,980,954, 4,012,733, 4,012,734, 4,016,429, 4,057,793, 4,058,678, 4,065,763, 4,107,656, 4,161,027, 4,173,754, 4,174,517, 4,218,655, 4,222,035, 4,239,940, 4,254,403, 4,307,380, 4,321,581, 4,323,882, 4,344,066, 4,357,598, 4,371,867, 4,377,804, 4,386,436, 4,400,688, 4,408,185, 4,408,186, 4,429,299, 4,433,326, 4,442,319, 4,471,399, 4,473,817, 4,475,193, 4,479,033, 4,495,386, 4,514,594, 4,523,307, 4,535,447, 4,538,136, 4,556,864, 4,556,865, 4,556,866, 4,559,520, 4,599,598, 4,609,839, 4,611,274, 4,633,218, 4,638,298, 4,638,299, 4,641,126, 4,641,322, 4,642,607, 4,644,321, 4,675,648, 4,701,945, 4,745,391, 4,745,392, 4,746,897, 4,749,992, 4,759,016, 4,763,103, 4,772,870, 4,774,493, 4,783,780, 4,788,527, 4,809,296, 4,829,570, 4,835,517, 4,845,466, 4,847,903, 4,864,589, 4,866,733, 4,890,089, 4,912,553, 4,962,496, 4,963,853, 4,968,970, 4,988,972, 4,995,053, 5,003,457, 5,032,833, 5,049,876, 5,063,563, 5,065,133, 5,066,939, 5,136,612, 5,151,838, 5,155,466, 5,168,510, 5,187,865, 5,192,231, 5,210,518, 5,241,283, 5,257,006, 5,262,755, 5,274,699, 5,278,862, 5,289,476, 5,319,634, 5,327,230, 5,349,644, 5,351,272, 5,355,114, 5,357,541, 5,404,127, 5,406,248, 5,406,249, 5,410,292, 5,412,369, 5,424,709, 5,448,593, 5,452,344, 5,461,629, 5,463,662, 5,467,011, 5,471,190, 5,504,454, 5,530,737, 5,530,741, 5,550,905, 5,554,968, 5,559,377, 5,630,204, GB 544,243, GB 549,948, GB 553,225, GB 683,265, GB 1,393,424, GB 2,094,598, AU-B1-12,488/76, Canada 1057436, Canada 1216689, EPO 0 078 171 A2, EPO 0 555 869 A2, PCT/US83/01717, PCT/US90/02291, PCT/US90/06701, PCT/US92/08510, PCT/US93/04726, PCT/US94/03110, and PCT/US95/00354 each of which is hereby incorporated by reference in its entirety for the material disclosed therein.

SUMMARY OF THE INVENTION

It is desirable to provide a method and system providing for the distribution of wireless communication signals within a building or other structure, using standard readily available AC power lines, and to there by permit the communication channel user to use the wireless communication device with minimal signal drop-outs.

Therefore, it is the general object of this invention to provide a method and system for distributing wireless communication signals throughout a building or other structure using AC power lines.

It is a further object of this invention to provide a method and system for distributing wireless communication signals throughout a building or other structure that minimizes signal drop-outs.

It is another object of this invention to provide a method and system for distributing wireless communication signals throughout a building or other structure that minimizes installation and maintenance cost.

A further object of this invention is to provide a method and system for distributing wireless communication signals throughout a building or other structure that is reliable in operation.

Another object of this invention is to provide a method and system for distributing wireless communication signals throughout a building or other structure that is compatible with standard personal communication systems (PCS's).

A still further object of this invention is to provide a method and system for distributing wireless communication signals throughout a building or other structure that is compatible with cellular telephone systems.

It is a further object of this invention to provide a method and system for distributing wireless communication signals throughout a building or other structure that is compatible with satellite communication systems.

It is still another object of this invention to provide a method for receiving wireless communication signals and distributing such signals over AC power lines within a building or other structure.

These and other objects of this invention are intended to be covered by this disclosure and are readily apparent to individuals of ordinary skill in the art upon review of the following drawings, detailed description and claims.

DETAILED DESCRIPTION OF THE PREFERRED EMBODIMENT OF THE INVENTION

This invention is a method and system for providing a communications distribution network using A/C power lines that is compatible with standard wireless communication devices such as personal communications systems (PCS), cellular, and satellite communication devices, and which addresses the problem of signal distortion and/or blockage common within certain buildings or other structures. In particular, the system of this invention comprises a radio frequency (RF) interface unit, a power line carrier (PLC) base unit, a PLC extension unit, and an RF conversion unit. These devices which are connected electronically, generally and preferably using existing AC power lines where ever possible. The method of this invention provides the preferred processing and communication steps used in the system of this invention to provide the distribution of the signals throughout the building or structure.

Figure 1:
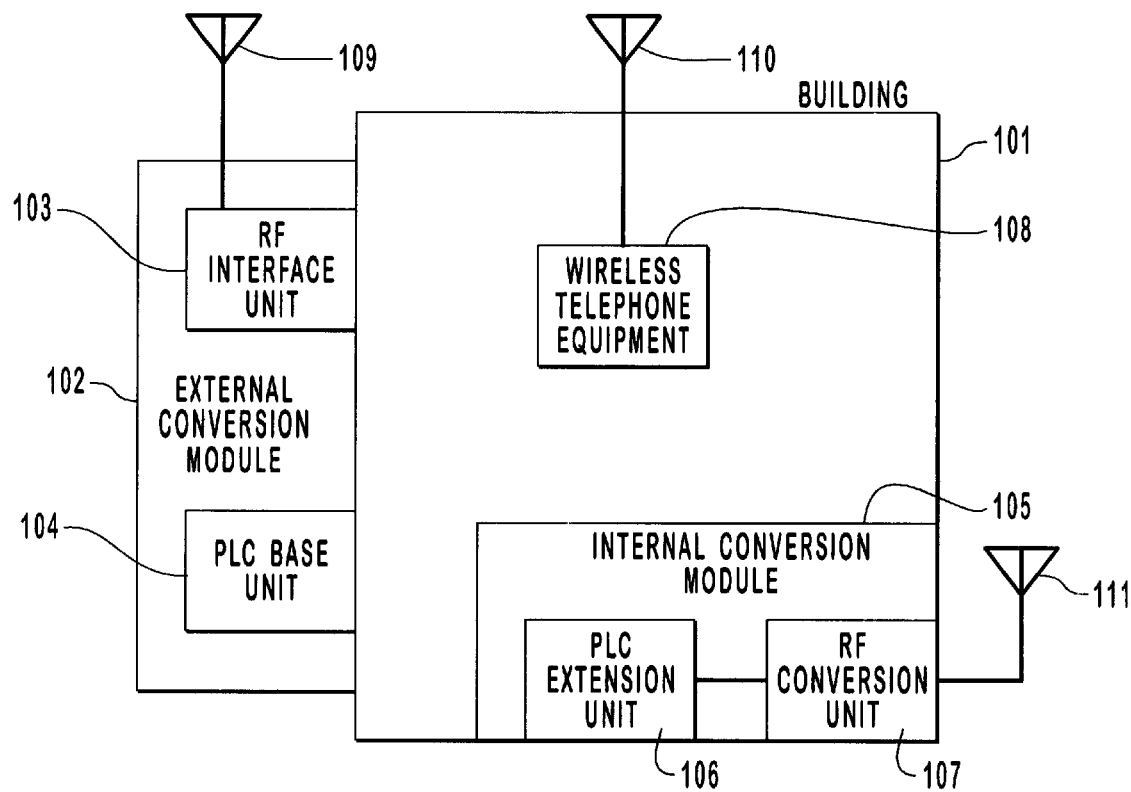
FIG. 1 depicts a representative drawing of the principle components of the preferred embodiment of this invention.

FIG. 1 shows a representative drawing of the principle components of the preferred embodiment of this invention in its preferred system configuration. Typically this invention operates within or in close proximity to a building or other structure 101. When receiving a signal from outside the building 101, the communication signal is first received by the External Conversion Module 102 via a standard communications antenna 109. Within the External Conversion Module 102 are two major units, the RF Interface Unit 103 and the PLC Base Unit 104. The RF Interface Unit 103 is electrically connected to the external antenna 109. Signals received by the RF Interface Unit 103, via the external antenna 109, are down converted to a baseband or low carrier frequency by the RF Interface Unit 103. The RF Interface Unit 103 next formats the resulting signal, which may be a voice, data, video, multi-media and/or control signal, and transmits the formatted signal to the PLC Base Unit 104 via a standard electrical connection. The PLC Base Unit 104 processes the received formatted signal and sends the processed signal over the existing AC power lines. Alternatively, the processed signal can be sent using analog techniques or it can be digitized and sent using a digital data link or, alternatively, it can be sent using spread spectrum techniques. Typically and preferably the PLC Base Unit 104 is connected to the AC power lines simply by being plugged into a standard two or three prong AC power outlet, although alternative direct wire connections are also supported by this invention. The signals being communicated over the AC power lines are received by the Internal Conversion Module 105, which is preferably includes a PLC Extension Unit 106 and an RF Conversion Unit 107. The PLC Extension Unit 106, connected directly to an AC power line, receives the signal from the PLC Base Unit 104 and communicates the signal over a standard electrical connection to the RF Conversion Unit 107. The RF Conversion Unit 107 formats the signal for standard typical wireless telephone or other communication equipment 108, unconverts it and transmits the data or information on the signal to the wireless telephone equipment 108 via an antenna 111 to antenna 110 channel.

Alternatively, when a user wishes to send a signal from the wireless telephone equipment 110 within the building 101 the reverse communications path is followed. The signal is generated by the standard wireless telephone or other communication equipment 108 and is transmitted antenna 110 to antenna 111 to the RF Conversion Unit 107 of the Internal Conversion Module 105. The RF Conversion Unit 107 processes, or down-converts, the signal for use by the PLC Extension Unit 106, which receives the processed signal across an electrical connection. The PLC Extension Unit 106 formats the signal and imposes it on the AC power line. Typically the PLC Extension Unit 106 is connected to the AC power line via a standard two or three prong plug, although alternative direct wire connections can also be supported by this invention. The PLC Base Unit 104, of the External Conversion Module 102, receives the signal across the AC power line and processes it for communication with the RF Interface Unit 103 which in turn up converts the signal for transmission via the antenna 109 to the outside receiver. This system provides significantly improved signal quality, signal to noise ration, and avoids blank spots to wireless communication inside buildings or other structures.

Figure 2:
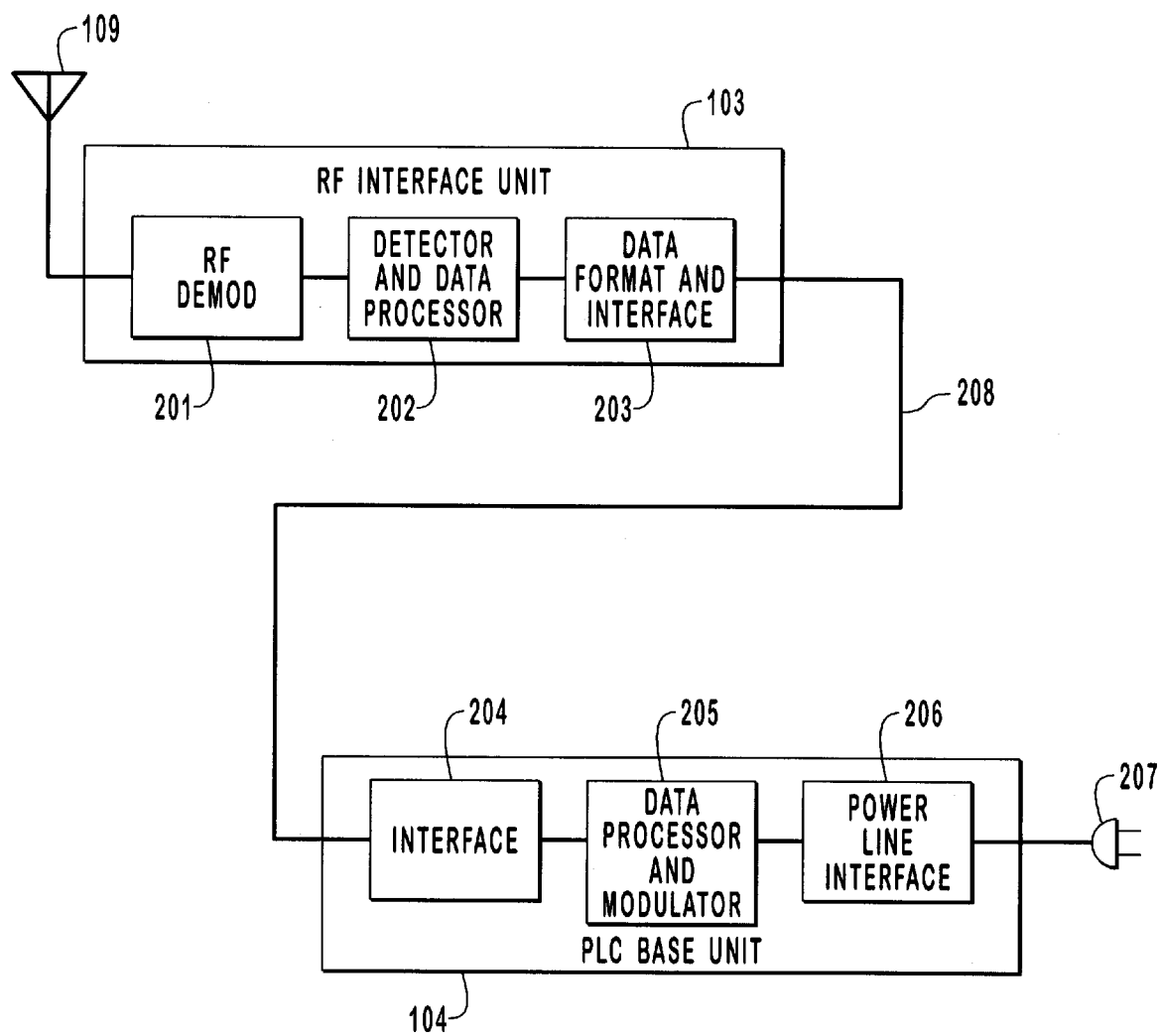
FIG. 2 depicts additional detail of the external conversion module of the preferred embodiment of the invention.

FIG. 2 shows the additional detail of the external conversion module 102 of the preferred embodiment of the invention, in particular this figure provides detail concerning the sub-components of the preferred embodiment of the external conversion module 102. The signal received by the antenna 109 is communicated to the RF Interface Unit 103 as described above. The preferred embodiment of the RF Interface Unit 103 consists of three modules: the RF Demodulator 201; the Detector and Data Processor 202; and the Data Format and Interface 203. The RF Demodulator 201 receives the RF signal, which originated from a PCS, Cellular, brig Satellite or other similar communication source and demodulates the RF information, processing it appropriate to the source and type of RF signal received. Such processing step is well known in the art of receivers common to each type of communication device. The RF Demodulator 201 then communicates electronically the resulting processed signal to the Detector and Data Processor 202, where the information is detected on the signal carrier, processed and electronically sent to the Data Format and Interface 203. The Data Format and Interface 203 prepares the data in the correct format for the Powerline Carrier (PLC) Base Unit 104. Typically and preferably the RF Interface Unit 103 and the PLC Base Unit 104 communicate electronically over an industry standard conductor 208. The PLC Base Unit 104 is preferably comprised of three modules: the Interface 204; the Data Processor and Modulator 205; and the Power Line Interface 206. The Interface 204 module receives the data from the Data Format and Interface 203 and send the data to the Data Processor and Modulator 205 where the data is modulated and formatted for transmission over the AC power lines. The Power Line Interface 206 provides power to the External Conversion Module 102 as well as interfaces the data from the Data Processor and Modulator 205 to the AC power lines 207. Typically, the connection between the Power Line Interface 206 and the AC power lines 207 is accomplished through a standard two or three prong AC outlet and plug combination, although alternative direct connections to AC power are also contemplated as functionally equivalent and within the scope of this invention.

Figure 3:
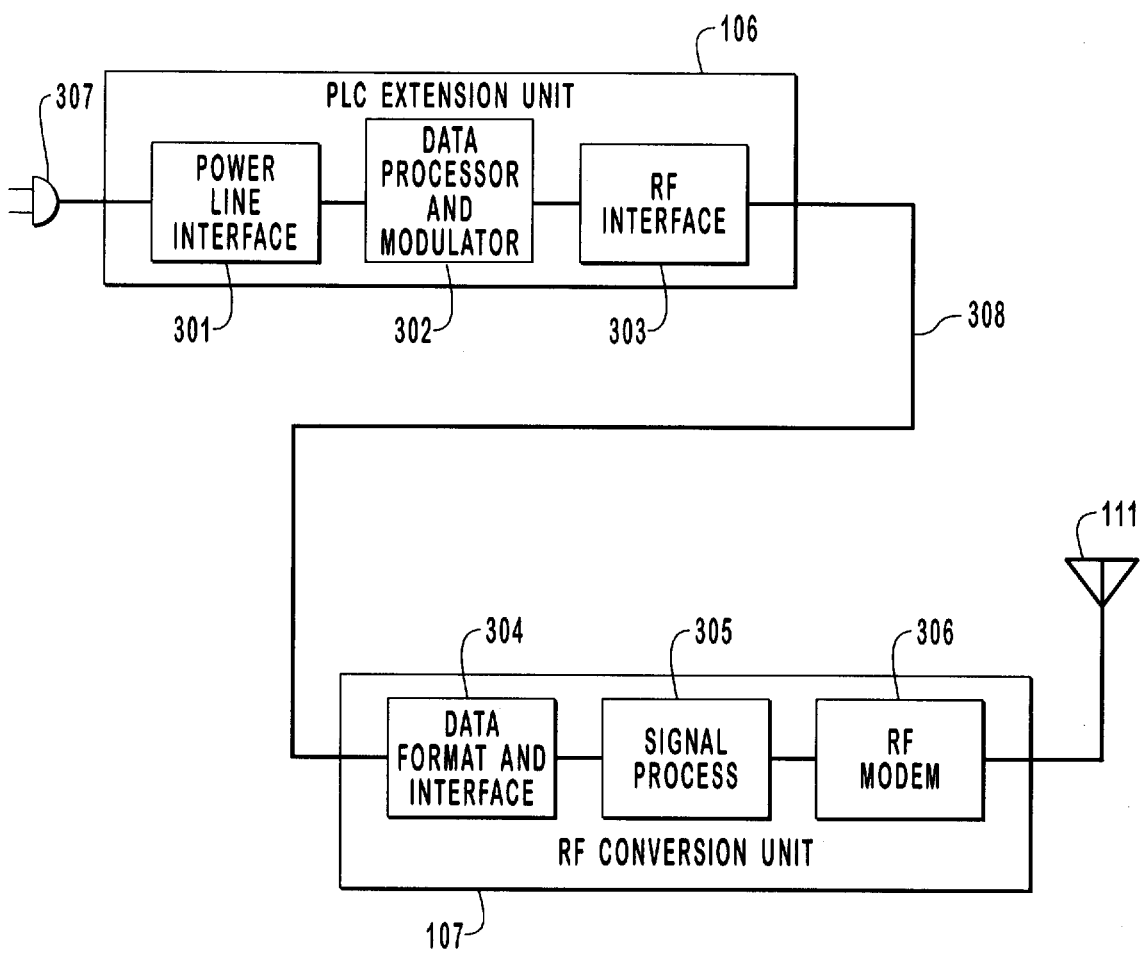
FIG. 3 depicts additional detail of the internal conversion module of the preferred embodiment of the invention.

FIG. 3 shows additional detail of the Internal Conversion module 105 of the preferred embodiment of the invention, in particular, this figure provides detail concerning the sub-components of the preferred embodiment of the Internal Conversion module 105. The preferred Internal Conversion module 105 consists of a Power Line Carrier (PLC) Extension Unit 106 and a RF Conversion Unit 107. The preferred PLC Extension Unit 106 consists of three modules: Power Line Interface 301; Data Processor and Modulator 302; and RF Interface 303. The AC power line 307 carrying the data from the Power Line Interface 206 of the PLC Base Unit 104 is connected, preferably and typically via a standard AC wall outlet and two or three prong plug, to the Power Line Interface 301 of the PLC Extension Unit 106. The Power Line Interface 301 not only receives the information from the AC power line connection 307 but it also provides power to the Internal Conversion Module 105. The data received by the Power Line Interface 301 is passed along to the Data Processor and Modulator 302 which processes the data, modulating it for use by the RF Interface 303. The RF Interface 303 provides the appropriate electrical interface for the RF Conversion Unit 107. Typically and preferably, the RF Interface 303 communicates with the RF Conversion Unit 107 across a standard electrical conductor 308. The Data Format and Interface 304 interfaces the received data for the RF Conversion Unit 107 and formats the data for the Signal Processor 305 which processes the communicated information and sends it to the RF Modem 306 to be upconverted and sent to the antenna 111 for distribution of the signal to the external wireless telephone devices.

Figure 4:
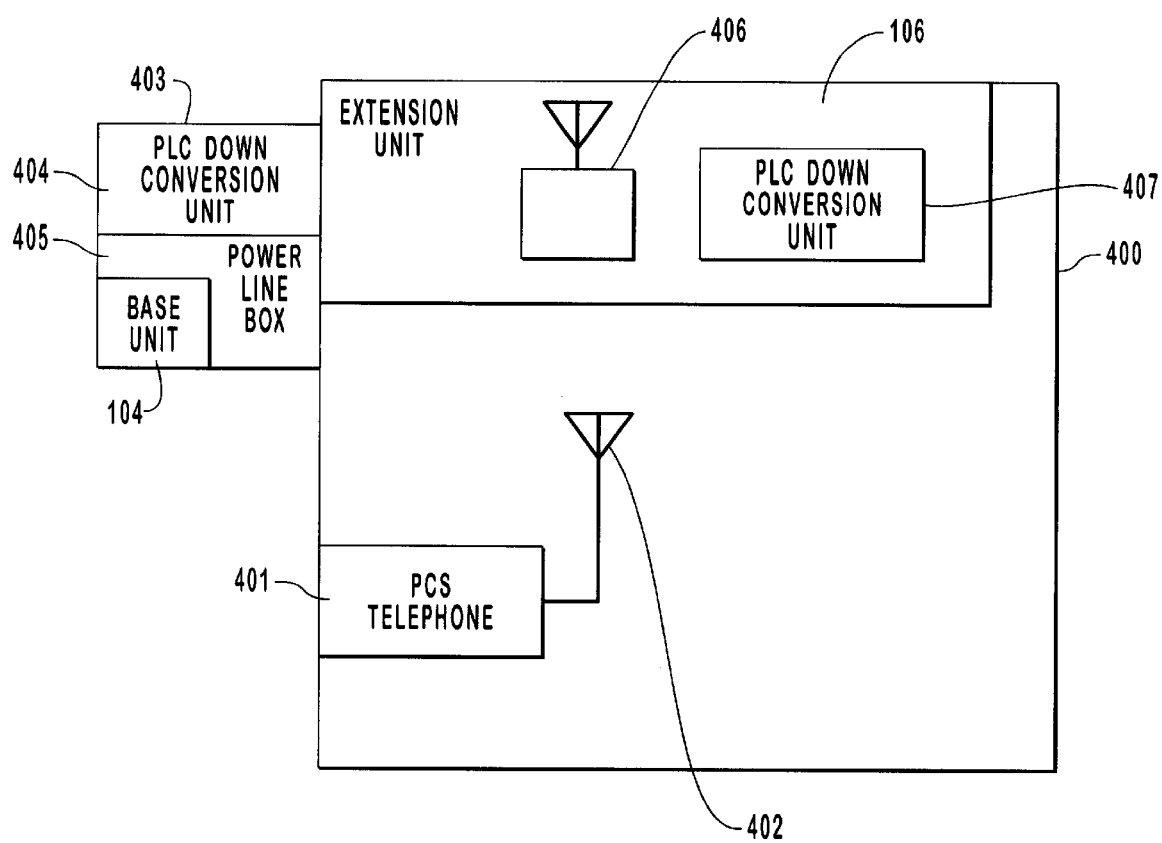
FIG. 4 depicts an overview drawing of the system of the preferred embodiment of the invention.

FIG. 4 shows an overview drawing of the system of the preferred embodiment of the invention employing a PCS phone. In this embodiment of the invention a receiver a receiver 403 is mounted and located outside the residence or office structure 400, preferably near a power distribution box. This receiver 403 is adapted to receive the wireless broadcast signal, which is downconverted and coupled into the power line box 405. The power line box 405 uses the base unit 104, previously described, to connect the signal to the power line. The preferred base unit 104 is embedded into the receiver 403. An extension unit 106 is plugged into an AC outlet 406 anywhere in the residence or office building structure 400. This extension unit 106 receives the power line signal transmitted from the base unit 104, after which the signal is upconverted 407 and retransmitted to the wireless (PCS) telephone equipment 401, which receives the signal via an antenna 402.

Figure 5:
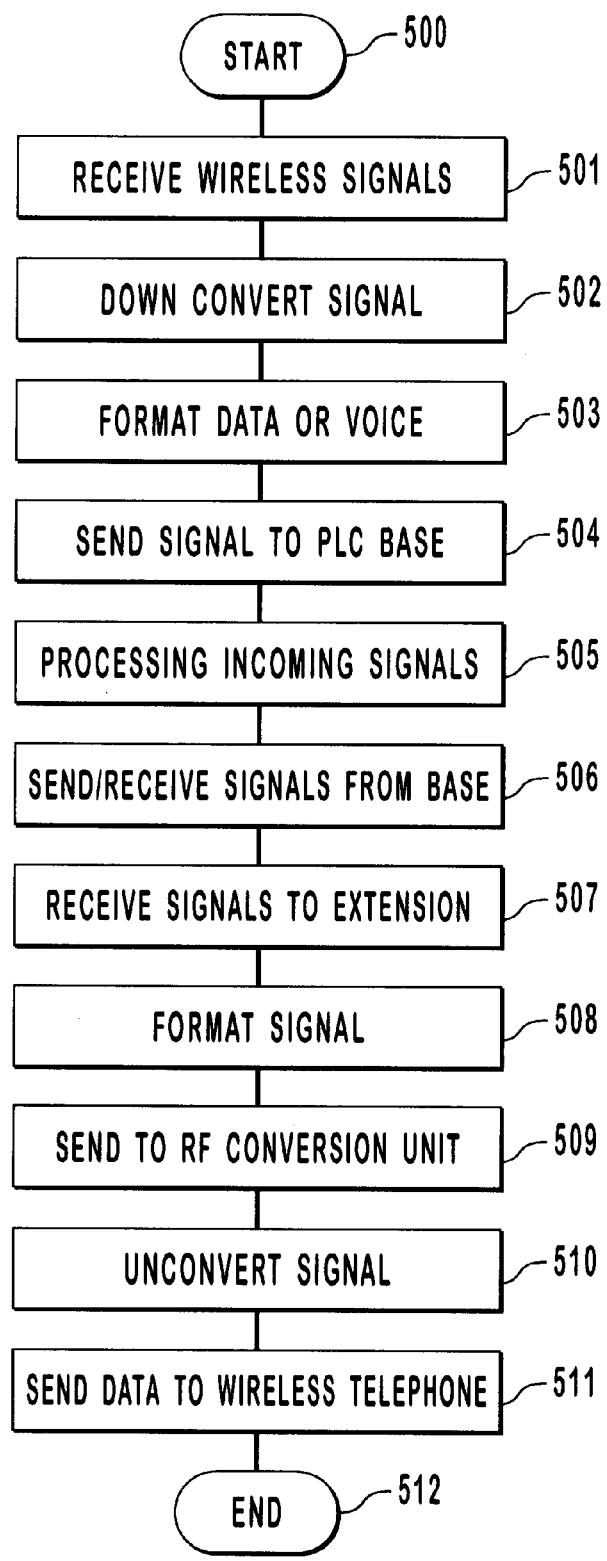
FIG. 5 depicts a flow chart showing the steps of the preferred method of this invention.

FIG. 5 shows a flow chart showing the steps of the preferred method of this invention. The method begins with the reception 501 of the wireless signals, typically via an antenna mounted on the outside of the building or other structure. The received signal is downconverted 502 to a baseband or low carrier center frequency. The downconverted signal is next formatted 503 into data, voice and/or control signals. The resulting formatted signal is next sent 504 to the PLC base unit, where it is processed 505 and sent 506 over the AC power lines. The PLC extension unit receives 507 the signal from the AC power lines and formats 508 the signal which then is sent 509 to the RF Conversion Unit. The received information is next unconverted 510 and sent 511 to the wireless telephone equipment for communication.

The described embodiments of this invention are to be considered in all respects only as illustrative and not as restrictive. Although, this embodiment of the invention describes voice telephone equipment, in alternatively can also be applied to electronic (computer modem) communication. Also, although this described embodiment of the invention makes use of well known data formatting methods, specific to certain communication devices, it is not intended to be limited thereto. Rather, this invention may alternatively employ other similar, currently known, or future developed formatting techniques. Similarly, this invention is not limited to specific components, and the substitution of alternative equivalent components should be considered within the scope of this invention. The scope of this invention is indicated by the appended claims rather than by the foregoing description. All changes which come within the meaning and range of equivalency of the claims are to be embraced within their scope.

We claim:

1. A system for the distribution of wireless signals comprising:
    (A) an antenna receiving a communication signal;
    (B) an external conversion module receiving said signal from said antenna and generating an AC power line compatible signal;
    (C) a AC power line communication channel receiving said AC power line compatible signal;
    (D) an internal communication module receiving said AC power line compatible signal and converting said AC power line compatible signal for wireless transmission, wherein said internal communication module further comprises:
        (1) a PLC extension unit; and
        (2) an RF conversion unit, electrically connected to said RF interface unit, wherein said RF conversion unit further comprises:
            (a) a data format and interface circuit;
            (b) a signal processor electrically connected to said data format and interface circuit;
            (c) an RF modem electrically connected to said signal processor, creating an up-converted signal; and
    (E) an antenna electrically connected to said RF modem, for receiving said up-converted signal and transmitting said signal to external wireless telephone communication device.

2. A system for the distribution of wireless signals, as recited in claim 1, wherein said external communication module further comprises:
    (1) an RF interface unit; and
    (2) a PLC base unit, electrically connected to said RF interface unit.

3. A system for the distribution of wireless signals, as recited in claim 2, wherein said RF interface unit further comprises:
    (a) an RF demodulator;
    (b) a detector and data processor electrically connected to said RF demodulator; and
    (c) a data format and interface circuit electrically connected to said detector and data processor.

4. A system for the distribution of wireless signals, as recited in claim 2, wherein said PLC base unit further comprises:
    (a) an interface circuit;
    (b) a first data processor and modulator electrically connected to said interface circuit; and
    (c) a first power line interface circuit electrically connected to said first data processor and modulator.

5. A system for the distribution of wireless signals, as recited in claim 1, wherein said PLC extension unit further comprises:
    (a) a second power line interface circuit;
    (b) a second data processor and modulator electrically connected to said second power line interface circuit; and
    (c) an RF interface circuit electrically connected to said second data processor and modulator.

6. A system for the distribution of wireless signals, as recited in claim 1, wherein said wireless communication device further comprises a PCS device.

7. A system for the distribution of wireless signals, as recited in claim 1, wherein said wireless communication device further comprises a cellular device.

8. A system for the distribution of wireless signals, as recited in claim 1, wherein said wireless communication device further comprises a satellite communication device.

* * * * *

UNITED STATES PATENT AND TRADEMARK OFFICE
CERTIFICATE OF CORRECTION

| | |
|---|---|
| PATENT NO. | : 6,243,571 B1 |
| APPLICATION NO. | : 09/157632 |
| DATED | : June 5, 2001 |
| INVENTOR(S) | : Bullock et al. |

It is certified that error appears in the above-identified patent and that said Letters Patent is hereby corrected as shown below:

Title page, item (56), under "U.S. Patent Documents", in Column 2, Line 7, delete "3,846,628" and insert -- 3,846,638 --.

Page 2, item (56), under "U.S. Patent Documents", in Column 2, Line 21, delete "5,151,383" and insert -- 5,151,838 --.

Column 6, line 1, in Claim 1, delete "a AC" and insert -- an AC --.

Signed and Sealed this
Twenty-eighth Day of August, 2012

David J. Kappos
*Director of the United States Patent and Trademark Office*